United States Patent [19]
Lang et al.

[11] Patent Number: 5,321,990
[45] Date of Patent: Jun. 21, 1994

[54] VORTEX FLOW METER

[75] Inventors: Michael Lang, Pfaffenhofen; Karl-Heinz Schulz, Weil am Rhein, both of Fed. Rep. of Germany

[73] Assignee: Endress+Hauser Flowtec AG, Switzerland

[21] Appl. No.: 23,105

[22] Filed: Feb. 26, 1993

[30] Foreign Application Priority Data

Feb. 27, 1992 [EP] European Pat. Off. ........ 92810142.7

[51] Int. Cl.⁵ .............................................. G01F 1/32
[52] U.S. Cl. .................................................... 73/861.24
[58] Field of Search .......................... 73/861.21, 861.24

[56] References Cited

U.S. PATENT DOCUMENTS

| | | | |
|---|---|---|---|
| 3,116,639 | 1/1964 | Bird | 73/861.24 |
| 3,683,691 | 8/1972 | Kivenson | 73/861.24 |
| 3,720,104 | 3/1973 | Zanker | 73/861.24 |
| 3,796,095 | 3/1974 | Fussell, Jr. | |
| 4,005,604 | 2/1977 | Herzl | |
| 4,161,878 | 7/1979 | Fussell, Jr. | |
| 4,716,770 | 1/1988 | Herzog | |

FOREIGN PATENT DOCUMENTS

| | | |
|---|---|---|
| 1-24571 | 9/1983 | Japan . |
| 60-82812 | 5/1985 | Japan . |
| 2144222 | 2/1985 | United Kingdom . |

*Primary Examiner*—Herbert Goldstein
*Attorney, Agent, or Firm*—Barnes & Thornburg

[57] ABSTRACT

A sensor measures the flow velocity and/or the volumetric flow rate of a fluid flowing in a pipe and in a measuring tube mounted therein, and includes a bluff body disposed in the conduit of the measuring tube, said bluff body being designed to generate Kármán vortices and having a blind hole which is in communication with the conduit via passages formed in the bluff body, a vortex sensor inserted into the blind hole and having an electrodynamic transducer responsive to the vortex-induced pressure fluctuations, said electrodynamic transducer supporting a first oscillating body being a sensor sleeve which is deflectable by the pressure fluctuations, has a first cavity sealed from the fluid, and supports a permanent magnet within the cavity, and a second oscillating body movably disposed within the cavity so as to be isolated from the pressure fluctuations and supporting at least one coil located opposite the permanent magnet.

9 Claims, 2 Drawing Sheets

VORTEX FLOW METER

FIELD OF THE INVENTION

The present invention relates to a vortex flow meter for measuring the flow velocity and/or volumetric flow rate of a fluid flowing in a pipe and in a measuring tube mounted therein.

BACKGROUND OF THE INVENTION

Such a vortex flow meter is described in U.S. Pat. No. 4,716,770. The conduit of the measuring tube contains a bluff body which is designed to generate Kámán vortices and has a blind hole which is in communication with the conduit via passages formed in the bluff body. Inserted in the blind hole is a vortex sensor with a capacitive transducer which is responsive to the vortex-induced pressure fluctuations and comprises a first and a second oscillating body, the first oscillating body being a sensor sleeve which is deflectable by the pressure fluctuations, has a cavity sealed from the fluid, and supports a capacitor electrode within the cavity, and the second oscillating body being movably disposed within the cavity so as to be isolated from the pressure fluctuations and supporting at least one additional capacitor electrode. Connected to the capacitor/ capacitors is a specific measuring circuit working on the switched-capacitor principle.

Although thousands of the prior art vortex flow meters have proved good in practice, the capacitive sensor, on the one hand, is not operable as a floating device because of the unilateral grounding of its capacitor electrode/electrodes and, on the other hand, does not allow a minimum power requirement of the measuring circuit. Particularly the charge reversals conditioned by the switched-capacitor principle and the power necessary therefor are disturbing in specific applications, e.g., if the requirements of the German standard DIN 19 230 (4-mA-to-20-mA technology) are to be met.

It has also turned out in practice that the manufacture of the prior art capacitive sensor is quite cost-intensive, since highly accurate mechanical processing steps, partly under clean-room conditions, are necessary. Also, the sensor is not always usable in the high-temperature range.

It is, therefore, an object of the invention to provide another sensor principle which is largely compatible with the prior art construction.

SUMMARY OF THE INVENTION

The invention therefore proposes a vortex flow meter for measuring the flow velocity and/or volumetric flow rate of a fluid flowing in a pipe and in a measuring tube mounted therein, comprising a bluff body disposed in the conduit of the measuring tube, said bluff body being designed to generate Kármán vortices and having a blind hole which is in communication with the conduit via passages formed in the bluff body, and further comprising a vortex sensor inserted into the blind hole and having an electrodynamic transducer responsive to the vortex-induced pressure fluctuations, said electrodynamic transducer supporting a first oscillating body being a sensor sleeve which is deflectable by the pressure fluctuations, has a first cavity sealed from the fluid, and supports a permanent magnet within the cavity, and a second oscillating body movably disposed within the cavity so as to be isolated from the pressure fluctuations and supporting at least one coil located opposite the permanent magnet.

The invention is based on proposals whose principles were described in connection with vortex flow meters long ago, namely on magnetoelectric and inductive transducers used as sensors of the vortex frequency, cf., for example, U.S. Pat. No. 3,796,095, U.S. Pat. No. 4,161,878, and Japanese Patent 60-82812, but the construction of these vortex flow meters differs widely from that of the invention.

The arrangements disclosed in U.S. Pat. No. 3,796,095 and Japanese Patent 60-82812 include, respectively, a ferromagnetic disk lying within a shuttle body moved back and forth by the vortex-induced pressure changes in the bluff body and a magnet moved back and forth by the vortex-induced pressure changes in the bluff body, said disk and magnet influencing the field of a permanent magnet. As a result, a voltage is induced in a coil wound on the permanent magnet. Thus, each of these arrangements represents not an electrodynamic sensor, but only a magnetoelectric sensor, in which coil and permanent magnet are not moved relative to each other.

In the arrangement disclosed in U.S. Pat. No. 4,161,878, a ferromagnetic diaphragm subjected to the vortex-induced pressure fluctuations is provided outside the bluff body and interacts with a magnetic sensor, which is not explained in detail. In this manner, a voltage is to be developed. What was said above applies here, too, namely that there is no relative motion between a permanent magnet and and any coil that may be present.

In a preferred embodiment of the invention, the coil is designed as an at least single-layer helix disposed on or on and in the surface of an insulating part, particularly of a ceramic substrate. On the other hand, however, the helix may also consist of ceramic-coated wire.

In another preferred embodiment of the invention, the permanent magnet is surrounded laterally within the sensor sleeve by a shield sleeve of a ferromagnetic material having a relative permeability much greater than one.

In a further preferred embodiment of the invention, the first and second oscillating bodies are so dimensioned that their respective mechanical resonance frequencies are greater than the maximum vortex frequency occurring in operation, and that under the action of pressure surges or compressive oscillations from the pipe, the deflections of the two oscillating bodies are, as far as possible, equal in magnitude and direction.

BRIEF DESCRIPTION OF THE DRAWINGS

The invention will become more apparent from the following description of a specific embodiment when read in connection with the accompanying drawings, in which like parts are designated by like reference characters.

DETAILED DESCRIPTION OF THE INVENTION

Figure 1:
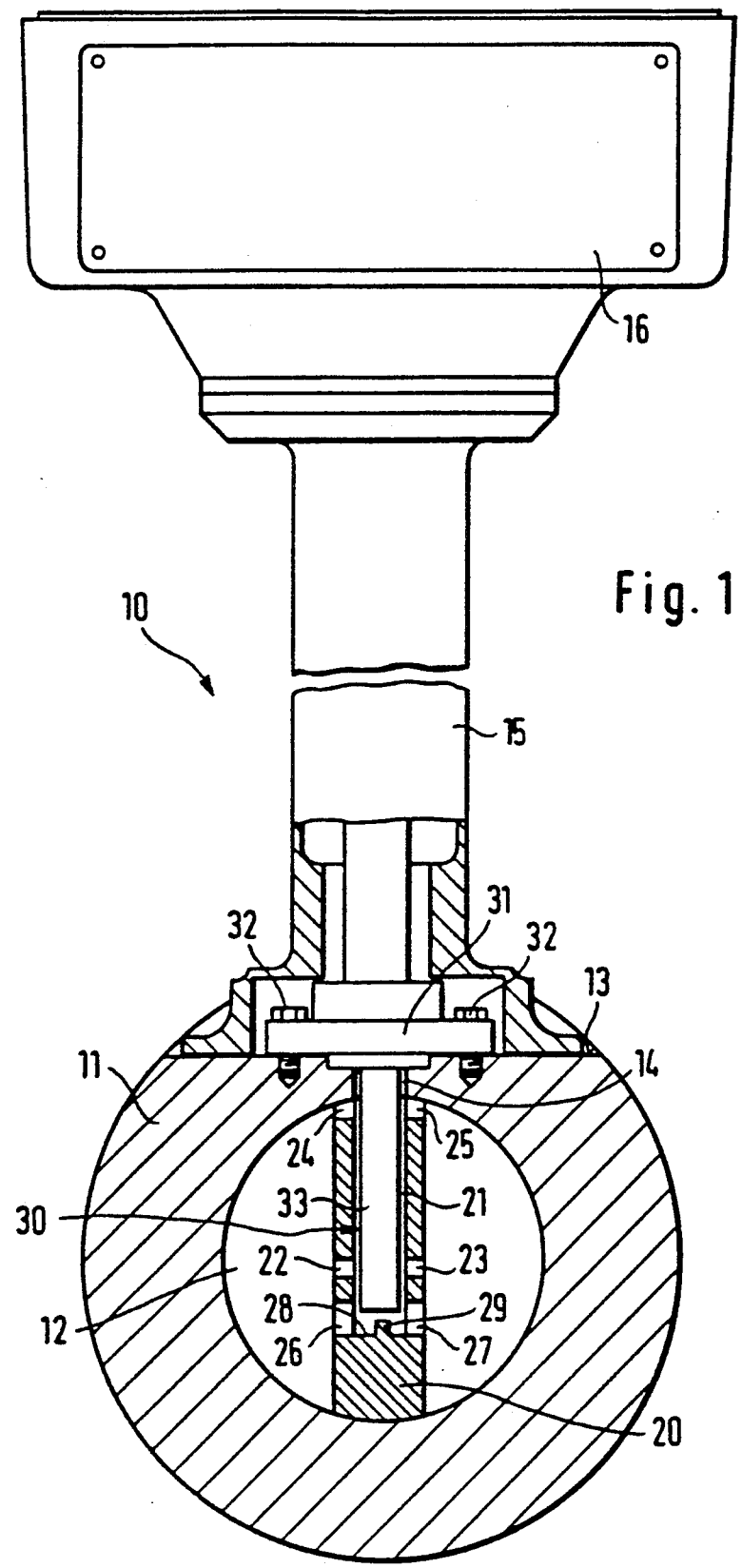
FIG. 1 is a partial sectional front view of a vortex flow meter.

The embodiment of a vortex flow meter 10 illustrated in FIG. 1 has a measuring tube 11, shown in cross section, which is inserted into a pipe (not shown) through which flows the fluid (liquids, gases, steam) to be measured. In FIG. 1, the fluid thus flows perpendicularly to the plane of the paper through the conduit 12 of the measuring tube 11.

At the side of the measuring tube 11 lying at the top in FIG. 1, a flat portion 13 is formed from which a radial bore 14 extends into the interior of the measuring tube 11. Mounted on the flat portion 13 is a tubular housing support 15 which carries a housing 16 for evaluation electronics at the end opposite the measuring tube 11.

Disposed inside the measuring tube 11 is a bluff body 20 which extends diametrically across the conduit 12 and has its two ends permanently connected, e.g., welded, to the wall of the measuring tube 11. The bluff body 20 is designed to generate a so-called Kármán vortex street in the fluid. To this end, it is formed as a prismatic body of constant cross section, which has, for example, the shape of an isosceles triangle whose base faces the direction of flow.

The bluff body 20, as is well known, generates two parallel vortex streets, the vortices of one of the streets being offset with respect to those of the other. The measurement of flow velocity is based on the fact that the distance between successive vortices in each vortex street is virtually constant over a wide velocity range. Thus, the recurrence frequency of the vortices, i.e., the number of vortices which pass through a given cross-sectional area per unit of time, is dependent only on, and directly proportional to, the flow velocity.

The vortex flow meter is therefore designed to form a signal which is characteristic of the recurrence frequency of the vortices. From this signal, the evaluation electronics derive or calculate the volumentric flow rate.

To this end, the bluff body 20 contains a blind hole 21, which extends in FIG. 1 from the body's upper end to nearly its lower end. The bluff body 20 is mounted in the measuring tube 11 so that the blind hole 21 is coaxial with a bore 14 in the wall of the measuring tube 11. The blind hole 21 is preferably cylindrical and has the same inner diameter as the bore 14.

The blind hole 21 further communicates with the conduit 12 of the measuring tube 11 via several passages which extend through the bluff body transversely to the direction of flow and lie opposite each other.

A first pair of passages 22, 23 is approximately on a level with the conduit axis, i.e., approximately half way up the bluff body 20. A second pair of passages 24, 25 lies at the upper end of the bluff body 20, directly at the wall of the measuring tube 11. A third pair of passages 26, 27 is disposed at the lower end of the blind hole 21 on a level with an end wall 28 of the blind hole 21. In the middle between the two lower passages 26, 27, a partition 29 of low height which extends parallel to the axis of the measuring tube 11 is formed on the end wall 28.

A vortex sensor 30 extends through the bore 14 into the blind hole 21, where it ends just in front of the partition 29, and it is supported by a flange 31 which is secured to the flat portion 13 by means of screws 32.

As can be seen in FIG. 1, the outer diameter of the vortex sensor 30 is slightly smaller than the inner diameter of the blind hole 21 in the bluff body 20, so that the vortex sensor 30 is spaced from the wall of the blind hole on all sides. The free space thus formed is filled with the fluid flowing in the conduit 12 via the passages 22 ... 27.

Figure 2:
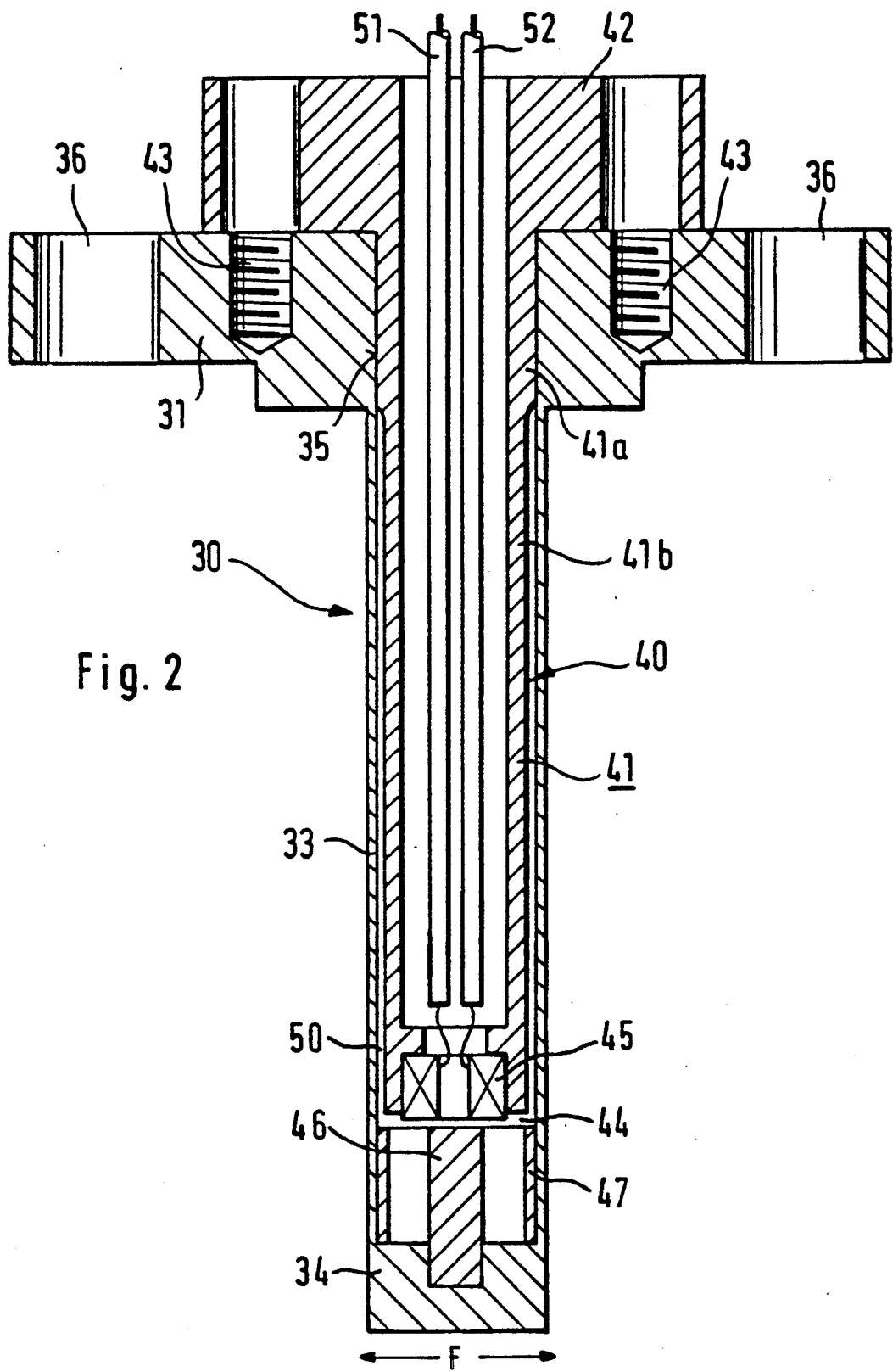
FIG. 2 is a sectional view of the vortex sensor of the vortex flow meter of FIG. 1.

The construction and details of the vortex sensor 30 are shown in FIG. 2. The vortex sensor 30 comprises two oscillating bodies. The first oscillating body is a tubular sensor sleeve 33 with a cavity 44 which is attached at one end to the flange 31 and is sealed at other end by an end wall 34. The flange 31 has a central opening 35 which is coaxial with the sensor sleeve 33 and has a diameter equal to the inner diameter of the sensor sleeve 33. The flange 31 further comprises a plurality of bores 36 distributed about its periphery for receiving screws 32 by means of which it is secured to the flat portion 13 (see FIG. 1). The sensor sleeve 33 may be formed integrally with the end wall 34 from the same material, e.g., from steel, particularly stainless steel. Mounted on or—as shown in FIG. 2—in the end wall 34, preferably coaxially with the axis of the sensor sleeve, is a permanent magnet 46, which, if mounted in the end wall 34, projects beyond the latter.

The permanent magnet can be, for example, an axially magnetized cylinder (length, e.g., 10 mm, diameter, e.g., 3 mm to 5 mm) of a, preferably high-coercivity, AlNiCo permanent-magnet material.

According to a further advantageous aspect of the invention, a shield sleeve 47 may be provided which is made of a ferromagnetic material with a relative permeability much greater than one and surrounds the permanent magnet 46 as completely as possible along the interior wall of the sensor sleeve 33. This prevents the magnetic field of the permanent magnet 46 from reaching the outside of the sensor sleeve 33. Thus, any ferromagnetic particles carried in the fluid cannot deposit there, and any obstruction of the passages 22 ... 27 is precluded.

The second oscillating body 40 of the vortex sensor 30 extends into the cavity 44 of the sensor sleeve 33 and is thus isolated from the pressure fluctuations acting on the sleeve. The second oscillating body 40 is inserted through the central opening 35 of the flange 31 and is constituted by a tube 41 which is connected, preferably formed integrally, with a further flange 42, and it is also made of steel, for example, particularly of stainless steel. It is secured to the top side of the flange 31 by means of screws 43 and extends to the vicinity, preferably the immediate vicinity, of the permanent magnet 46 without touching the latter, of course. Disposed at the end of the tube 41 opposite the permanent magnet 46 is a coil 45 which is located in the field of the permanent magnet 46. Coil 45 and permanent magnet 46 thus form an electrodynamic transducer.

The tube 41 of the second oscillating body 40, which thus also acts as a coil support, has two portions of different diameter. A first portion 41a, fitted in the central opening 35 of the flange 31, has an outer diameter equal to the diameter of the central opening 35, so that a tight fit and precise positioning of the coil support are ensured.

A second portion 41b forms the remainder of the tube 41 and has an outer diameter slightly smaller than the inner diameter of the sensor sleeve 33, so that the circumference of the latter is completely separated from the portion 41b by a narrow annular clearance 50.

From the coil 45, leads 51, 52 extend through the hollow interior of the tube 40 and through the tubular housing support 15 (see FIG. 1) to the evaluation electronics contained in the housing 16.

The above-described construction of the vortex flow meter 10 results in the following mode of operation:

Each of the two constituent parts of the vortex sensor 30 represents an elongate oscillating body 33, 40 which is firmly clamped and held at one end, and whose other, free end can be deflected from the rest position shown in FIG. 2 transversely to its longitudinal direction under the action of a force F, which is illustrated by the double-headed arrow.

When a fluid flows through the measuring tube 11 and the two vortex streets form at the bluff body 20, periodic, oppositely phased pressure fluctuations result on both sides of the bluff body which are transmitted through the passages 22, 23 into the cavity 21 and act on the sensor sleeve 33. As a result, the sensor sleeve 33 is moved to and fro transversely to its longitudinal direction and transversely to the direction of flow being clamped at its upper end, it is subjected to bending stress, so that under the action of the pressure fluctuations, it executes flexural vibrations whose frequency is equal to that of the pressure fluctuations.

The flexural vibration self-resonant frequency of the sensor sleeve 33 is substantially higher than the highest possible frequency of the pressure fluctuations. Thus, the flexural vibrations of the sensor sleeve 33 are excited subcritically and precisely follow the pressure fluctuations in frequency and phase. The amplitudes of flexural vibrations are very small, and the vortex sensor 30 is so dimensioned that at the largest amplitudes occurring in operation, the sensor sleeve 33 will strike neither the wall of the cavity 21 nor the coil support 40.

The upper passages 24, 25 and the lower passages 26, 27 in the bluff body 20 permit free circulation of the fluid between cavity 21 and conduit 12, so that the fluid can yield to and follow the vibrations of the sensor sleeve 33 unhindered. The partition 29 between the lower passages 26, 27 prevents direct pressure compensation around the lower end of the sensor sleeve 33 (see FIG. 1).

The coil support 40 in the interior of the sealed sensor sleeve 33 is not in contact with the fluid and is therefore totally isolated from the pressure fluctuations of the fluid; it thus remains at rest with respect to the latter. Consequently, the free end of the sensor sleeve 33 with the permanent magnet 46 moves relative to the fixed end of the coil support 40 and the coil 45 mounted there, so that a voltage will be induced in the coil whose frequency is equal to that of the flexural vibrations. The evaluation electronics in the housing 16 amplify this voltage and derive therefrom a signal quantity representative of the flow velocity and/or the volumetric flow rate.

If, instead of the pressure fluctuations of the fluid, external forces act via the clamping points on the two oscillating bodies,, the latter will be set jointly into flexural vibration, so that the free ends of the sensor sleeve 33 and the coil support 40 will be deflected in the same direction. Such forces may be cause, for example, by vibrations which set the measuring tube 11 and, thus, the sensor clamping point into translatory oscillation in an arbitrary axial direction or tend to rotate the two oscillating bodies about the clamping points.

By suitable construction and dimensioning of the two oscillating bodies, it can be ensured that practically no relative motion occurs between permanent magnet 46 and coil 45 , so that no interference voltage will be caused by the external forces. Thus, if the vortex-induced pressure fluctuations occur together with the external forces, only the relative motion caused by the former will take place. The vortex sensor is therefore insensitive to external disturbing influences and permits reliable detection of the pressure fluctuations even under disturbed conditions.

We claim:

1. A vortex flow meter for measuring the flow velocity and/or volumetric flow rate of a fluid flowing in a pipe and in a measuring tube mounted therein, comprising a bluff body disposed in the conduit of the measuring tube, said bluff body being designed to generate Karman vortices and having a blind hole which is in communication with the conduit via passaged formed in the bluff body, and further comprising a vortex sensor inserted into the blind hole and having an electrodynamic transducer responsive to the vortex-induced pressure fluctuations, said electrodynamic transducer supporting a first oscillating body being a sensor sleeve which is deflectable by the pressure fluctuations, has a first cavity sealed from the fluid, and supports a permanent magnet within the cavity, a second oscillating body movably disposed within the cavity so as to be isolated from the pressure fluctuations and supporting at least one coil located opposite the permanent magnet, and a shield sleeve of ferromagnetic material surrounding the permanent magnet laterally within the sensor sleeve and having a relative permeability much greater than one.

2. A vortex flow meter as claimed claim 1 wherein the at least one coil is designed as an at least single-layer helix and disposed on or in a surface of an insulating part.

3. A vortex flow meter as claimed claim 1 wherein the first and second oscillating bodies are so dimensioned that their respective mechanical resonance frequencies are greater than the maximum vortex frequency occurring in operation, and that under the action of pressure surges or compressive oscillations from the pipe, the deflections of the two oscillating bodies are, as far as possible, equal in magnitude and direction.

4. A vortex flow meter as claimed in claim 2 wherein the first and second oscillating bodies are so dimensioned that their respective mechanical resonance frequencies are greater than the maximum vortex frequency occurring in operation, and that under the action of pressure surges or compressive oscillations from the pipe, the deflections of the two oscillating bodies are, as far as possible, equal in magnitude and direction.

5. A vortex flow meter as claimed claim 2 wherein the insulating part is a ceramic substrate.

6. A vortex flow meter for measuring the flow rate of a fluid flowing in a pipe, the flow meter comprising:

a measuring tube configured to be mounted in the pipe, the measuring tube being formed to include a conduit through which fluid flows;

a bluff body coupled to the measuring tube, the bluff body extending across the conduit to generate Karman vortices, the bluff body being formed to include a blind hole therein and a plurality of passages configured to provide fluid communication between the conduit and the blind hole;

a vortex sensor configured to be inserted into the blind hole, the vortex sensor including a sensor sleeve which is deflectable by the pressure fluctuations, the sensor sleeve defining a cavity sealed from the fluid, an electrodynamic transducer responsive to vortex-induced pressure fluctuations, said electrodynamic transducer including a permanent magnet located within the cavity, a second oscillating body movably disposed within the cavity so as to be isolated from the pressure fluctuations, the second oscillating body supporting at least one coil located opposite from the permanent magnet, and a shield sleeve made from a ferromagnetic material, the shield sleeve surrounding the permanent magnet laterally within the sensor sleeve and having a relative permeability greater than one.

7. The vortex flow meter of claim 6, wherein the at least one coil is designed as an at least single-layer helix and disposed on or in a surface of an insulating part.

8. The vortex flow meter as claimed in claim 7, wherein the insulating part is a ceramic substrate.

9. The vortex flow meter of claim 6, wherein the first and second oscillating bodies are so dimensioned that their respective mechanical resonance frequencies are greater than a maximum vortex frequency occurring in operation, and that under the action of pressure surges or compressive oscillations from the pipe, the deflections of the two oscillating bodies are substantially equal in magnitude and direction.

* * * * *